United States Patent [19]

Novich et al.

[11] Patent Number: 4,816,182
[45] Date of Patent: Mar. 28, 1989

[54] LIQUEFACTION OF HIGHLY LOADED PARTICULATE SUSPENSIONS

[75] Inventors: Bruce Novich, Lexington; Richard Pober, Waban, both of Mass.

[73] Assignee: Ceramics Process Systems Corporation, Cambridge, Mass.

[21] Appl. No.: 856,803

[22] Filed: Apr. 25, 1986

[51] Int. Cl.$^4$ .................. B01J 13/02; C04B 35/02; C04B 35/10; C04B 33/32

[52] U.S. Cl. .................. 252/313.1; 252/309; 252/314; 264/56; 264/63; 264/86; 264/302; 501/1; 501/94

[58] Field of Search .................. 252/309, 314, 313.1; 106/38.2, 287.17, 287.19; 264/86, 212, 56, 302; 501/1, 94

[56] References Cited

U.S. PATENT DOCUMENTS

| | | | |
|---|---|---|---|
| 3,361,680 | 1/1968 | Bohrer | 252/309 X |
| 4,026,819 | 5/1977 | Langere et al. | 252/309 X |
| 4,166,147 | 8/1979 | Lange et al. | 252/310 X |
| 4,354,872 | 10/1982 | Kekish et al. | 252/309 X |
| 4,376,654 | 3/1983 | Zola | 252/310 X |
| 4,548,733 | 5/1985 | Vincent | 252/310 |
| 4,569,920 | 2/1986 | Smith-Johannsen | 501/94 |
| 4,574,003 | 3/1986 | Gerk | 252/315.7 X |
| 4,624,800 | 11/1986 | Sasaki et al. | 252/314 |
| 4,677,082 | 1/1987 | Alford et al. | 501/88 |

FOREIGN PATENT DOCUMENTS

| | | |
|---|---|---|
| 0063699 | 8/1982 | European Pat. Off. . |
| 0176200 | 10/1986 | European Pat. Off. . |
| 3011911 | 3/1981 | Fed. Rep. of Germany . |
| 2026006 | 3/1980 | United Kingdom . |

Primary Examiner—Teddy S. Gron
Assistant Examiner—Virginia B. Caress
Attorney, Agent, or Firm—Bradley N. Ruben

[57] ABSTRACT

Suspensions of ceramic or metallic colloidal particles having a high volume fraction (greater than about 55 vol. %) solid particles are provided in a pourable form. The pourable suspension includes at least about 55 vol. % ceramic or metallic colloidal particles, an aqueous vehicle, and an acrylic acid-based polymeric polyelectrolytic dispersant. Such suspensions can be prepared by mixing the colloidal particles in a staged order of addition and under a high shear rate with the other components. The suspensions are suitable for making ceramic or metallic articles, and can exhibit a low viscosity.

18 Claims, No Drawings

LIQUEFACTION OF HIGHLY LOADED PARTICULATE SUSPENSIONS

FIELD OF THE INVENTION

This invention relates to ceramic and related technologies, and in particular, to the production of pourable suspensions of narrow size distribution particulates having greater than 55 volume percent of solids.

BACKGROUND ART

Advances in ceramic processing have permitted the replacement of various components of electrical and mechanical equipment with sintered ceramic parts. Ceramics have found widespread use in electronics as a substrate for integrated circuit packages. Ceramic substrates are typically formed by sintering slips produced from suspensions of ceramic particles. However, ceramics have exhibited problems of cracking, large and inconsistent shrinkage upon drying and firing, and nonuniform formability. Prior slip casting and tape casting systems have resulted in a green part with a low particle density, typically less than 55 percent of theoretical particle density. Low particle density results in low green strength, and the problem is exacerbated by the requirement of removing the binder used in the casting process.

Two types of dispersant mechanisms are known: steric dispersants, which utilize the size and conformation of the dispersant molecule; and electrostatic dispersants, which use electrical charge to cause dispersion. Typical steric dispersants include polymeric polyelectrolytes and carboxylic acids. Steric solvents are understood to operate by presenting (i) functional groups exhibiting strong surface interaction with the particle surface while being only marginally soluble in the solvent and (ii) stabilizing moieties that are highly soluble in the solvent. Electrostatic dispersants include acids and bases which operate to modify the pH of the suspending medium. Typically, dispersing agents have been used in aqueous and other solutions to create pourable suspensions of submicron particles having a maximum solids fraction of approximately 50 volume percent. Although this maximum solids fraction can be higher if the particles do not have a narrow size range, uniform size particles are required for uniform ceramics having uniform properties, such as reproducible shrinkage for net shape forming, and for high performance applications.

A higher volume percent of solids would result in less shrinkage upon drying and sintering, superior green strength, and a reduction in the probability of a large defect or void in particle packing. In addition, faster processing results from the reduced volume fraction of liquid.

Accordingly, there exists a need for a system for maintaining a maximum solids content of narrow size distribution in suspension, thereby maximizing green strength and minimizing shrinkage, while still maintaining the components in a flowable or pourable state.

DISCLOSURE OF INVENTION

The present invention provides a highly loaded suspension of narrow size distribution particles giving good green strength while simultaneously obviating the need for a separate binder and having low organic solids content during burnout, thereby reducing the risk that voids will be created and eliminating burnout as a rate-limiting step. We have discovered that pourable, highly loaded particulate can be produced by mixing the particles, a selected dispersant, and a selected liquid. Aqueous suspensions in a preferred embodiment may utilize polymeric polyelectrolytes and alcohol suspensions may utilize triethanolamine. Moreover, slips made from suspensions produced in accodance with the present invention demonstrate susperior green strength. This superior green strength is due in part to the closer packing of narrow size range particles in a high solids content suspension. Importantly, such enhanced green strength also results from the fact that selected dispersants act as a binder in high solids content suspensions. Further details and embodiments of the invention are described below.

DESCRIPTION OF SPECIFIC EMBODIMENTS

We have found that conventional dispersing agents will not permit the production of high solid content suspensions of colloidal particles of narrow size distribution having low viscosity. The physical chemistry of colloidal particles having a narrow size range is markedly different from that of conventional colloidal particles. Moreover, conventional dispersing agents that are satisfactory at low volume fractions of solids are unsatisfactory at higher volume fractions of solids. For example, Darvan C and Darvan 821A brand of ammonium polyacrylate copolymer dispersants, available commercially from R. T. Vanderbilt Company, 30 Winfield Street, Norfolk, Conn. 06855, are suitable for volume fraction solids below 50 percent in aqueous suspension but yield an unacceptably high viscosity at volume fractions above approximately 60 percent. Notwithstanding these results, we have found that certain other polymeric polyelectrolytes will work satisfactorily at volume fractions above 50 percent. As another example, in alcoholic suspensions, carboxylic acid is suitable for volume fraction solids below 50 percent, but yields an unacceptable high viscosity at volume fractions much above this figure. We have found, however, that other steric dispersants work satisfactorily at volume fractions above 50 percent.

Prior art suspensions having volume fraction solids below 50 percent exhibit substantial shrinkage on drying, and require controlled drying procedures. We have found that pourable suspensions of colloidal particles can be made with such a high volume fraction of solids that when only a small quantity of liquid is removed from the suspension, as for example by evaporation, the suspension sets very rapidly into a solid with a concomitantly small amount of shrinkage.

Our invention can be used to produce pourable suspensions of alumina having a viscosity of less than 200 centipoise, with greater than 60 volume percent alumina in alcohol using triethanolamine (TEOA) as a dispersant, and greater than 60 volume percent alumina in water using LD-45 as a dispersant. Slips produced from such suspensions exhibit rapid set, low and reproducible shrinkage of approximately 1% upon drying, and easy formability.

Generally we have found that aqueous suspensions of narrow size distribution colloidal particles may achieve volume fraction solids in excess of approximately 55 percent, while maintaining low viscosity, if the dispersing agent is properly selected. The dispersant must be readily adsorbed onto the particles, and accordingly, the selection of dispersant is a function of both particle and solvent choice. We have found that selected polymeric polyelectrolytes have produced these results when they have a molecular weight less than approximately 10,000.

Generally, a preferred embodiment of the invention involves the step of mixing colloidal particles, having a narrow size range, in a slightly greater than critical amount of liquid, with dispersant and an appropriate grinding medium used for deagglomerating the particles, for a relatively brief time (less than approximately one hour), preferably with powder being added to the liquid in stages in a high amplitude vibratory mill until the desired volume fraction of solids is attained. Alternatively, mixing could take place at a lower than desired volume fraction of solids, and liquid extracted until the desired volume fraction of solids is attained. The present invention may be used to produce highly loaded suspensions of alumina in water, using as a dispersant a polymeric polyelectrolyte such as NARLEX LD-45 or LD-42 brand of ammonium acrylate copolymer and sodium acrylate copolymer, respectively. LD-45 and LD-42 are offered for sale by National Starch and Chemical Corporation, Finderne Avenue, P.O. Box 6500, Bridgewater, New Jersey 08807. LD-45 is currently offered for sale as a dispersant for titania and organic pigments. The relatively low molecular weight of LD-45 (especially in comparison to other typically used additives for dispersing, binding, and plasticizing) facilitates subsequent burnout of slips formed from suspension. The present invention may also be used to produce highly loaded suspensions of alumina in alcohol, using as a dispersant TEOA. Suspensions produced in accordance with the present invention subsequently enter a slip forming phase, in which the slips are deaired, using a defoaming agent such as octanol, and agitated to avoid the formation of ordered arrays prior to forming the part.

It will be appreciated that the invention may be generally employed with colloidal particles of oxide ceramics and with metal particles having an oxide surface.

The following examples are illustrative of the invention:

EXAMPLE I

Suspensions of alumina in alcohol, having greater than 60 V % alumina a viscosity less than approximately 200 centipoise, were prepared in the following manner. Dried alumina particles of narrow size distribution having a mean size of approximately 0.5 micrometers and ranging in size from approximately 0.3 to 0.8 micrometers were mixed with isopropyl alcohol and ½ weight percent TEOA (such fraction based on weight of dried powder), and mixed in a container with the appropriate amount of grinding media (for deagglomerating particles). The mixtures were then milled in a high amplitude vibratory mill for up to approximately one hour, and were then ready for use. The slips exhibited high green strength and rapid set (approximately 5 minutes) at room temperature; less than 1 minute at 40° C.) and low shrinkage (approximately 1%) upon drying.

EXAMPLE II

Suspensions of alumina in water, having greater than 60 V% alumina and viscosity less than approximately 200 centipoise were prepared using LD-45 as a dispersant. The basic procedure was similar to that described above, using the same type of dried alumina particles as described above, with water as the liquid in lieu of alcohol, and LD-45 in lieu of TEOA. The concentration of LD-45 was 1.5 weight percent (based on weight of dried powder). The slips exhibited high green strength, rapid set (approximately 1 hour at room temperature, 5 minutes at 40° C., and less than one minute at 100° C.), and low shrinkage (approximately 1%).

What is claimed is:

1. A process for forming a suspension in water of particles having a narrow size distribution, comprising: mixing colloidal particles, selected from the group consisting of ceramics and metals, and having a narrow size distribution, in a staged order of addition, with water and an acrylic acid-based polymeric polyelectrolyte, while agitating the mixture under high shear rate until the added particles are present in at least about 55 volume percent of the mixture, such that the particles, water, and polymeric polyelectrolyte are thoroughly dispersed to provide a pourable suspension.

2. A process according to claim 1, wherein step (a) includes mixing colloidal particles which are ceramic particles.

3. A process according to claim 1, wherein step (a) includes mixing particles selected from the group consisting of oxide ceramics and metals having an oxidized surface.

4. A process according to claim 3, wherein step (a) includes mixing oxide ceramic particles selected from the group consisting of alumina, zirconia, titania, and any combination thereof.

5. A process according to claim 1, wherein the polymeric polyelectrolyte has moieties selected from the group consisting of ammonium acrylate, sodium acrylate, and mixtures thereof.

6. A process according to claim 5, wherein step (a) includes mixing alumina and the polymeric polyelectrolyte that is an ammonium acrylate copolymer, resulting in a mixture having greater than approximately 60 volume percent solids.

7. A process according to claim 1, wherein the step of agitating includes milling the mixture in a vibratory mill.

8. A process according to claim 1, wherein the step of agitating includes ultrasonically agitating the mixture.

9. A process for forming a solid shape from an aqueous suspension of narrow distribution particles, comprising:
    (a) mixing at least about 55 volume percent colloidal particles selected from the group consisting of ceramics and metals, and having a narrow size range distribution, in a staged order of addition, with water and an acrylic acid-based polymeric polyelectrolyte, while agitating under high shear rate until the particles, water and polymeric polyelectrolyte are thoroughly dispersed, to produce a pourable suspension having at least about 55 volume percent particles;
    (b) deairing the suspension;
    (c) forming a shape from the deaired suspension; and
    (d) solidifying the shaped suspension by allowing the water therein to escape.

10. A process according to claim 9, wherein step (a) includes mixing colloidal particles which are ceramic particles.

11. A process according to claim 9, wherein step (a) includes mixing particles selected from the group consisting of oxide ceramics and metals having an oxide surface.

12. A process according to claim 11, wherein the polymeric polyelectrolyte has moieties selected from the group consisting of ammonium acrylate, and sodium acrylate, and mixtures thereof.

13. A suspension, comprising:
   water;
   an acrylic acid-based polymeric polyelectrolyte; and
   colloidal particles selected from the group consisting of ceramics and metals, and having a narrow size range distribution; wherein the suspension has at least about 55 volume percent particles and has amounts of water and polyelectrolyte effective to render the suspension pourable.

14. A suspension according to claim 13, wherein the colloidal particles include ceramic particles.

15. A suspension according to claim 14, wherein the particles are selected from the group consisting of oxide ceramics and metals having an oxide surface.

16. A suspension according to claim 15, wherein the oxide ceramic particles are selected from the group consisting of alumina, zirconia, titania, and any combination thereof.

17. A suspension according to claim 16, wherein the polymeric polyelectrolyte has moieties selected from the group consisting of ammonium acrylate, sodium acrylate, and mixtures thereof.

18. A suspension according to claim 17, wherein the concentration of the particles is at least 60 volume percent.

* * * * *